US012750450B2

(12) United States Patent
Takahashi et al.

(10) Patent No.: US 12,750,450 B2
(45) Date of Patent: Sep. 29, 2026

(54) IMAGE READING DEVICE INCLUDING AN IMAGE PATTERN PORTION AND IMAGE FORMING APPARATUS

(71) Applicants: Shigeo Takahashi, Kanagawa (JP); Shoji Imazeki, Kanagawa (JP); Masamune Koyanagi, Kanagawa (JP)

(72) Inventors: Shigeo Takahashi, Kanagawa (JP); Shoji Imazeki, Kanagawa (JP); Masamune Koyanagi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 266 days.

(21) Appl. No.: 18/428,453

(22) Filed: Jan. 31, 2024

(65) Prior Publication Data

US 2024/0297943 A1 Sep. 5, 2024

(30) Foreign Application Priority Data

Mar. 3, 2023 (JP) ................................ 2023-032505

(51) Int. Cl.
*H04N 1/00* (2006.01)
*H04N 1/10* (2006.01)

(52) U.S. Cl.
CPC ..... *H04N 1/00814* (2013.01); *H04N 1/00111* (2013.01); *H04N 1/00588* (2013.01); *H04N 1/0066* (2013.01); *H04N 1/00734* (2013.01); *H04N 1/1061* (2013.01)

(58) Field of Classification Search
CPC ........... H04N 1/00814; H04N 1/00111; H04N 1/00588; H04N 1/0066; H04N 1/00734; H04N 1/1061; H04N 1/12; H04N 1/193
See application file for complete search history.

(56) References Cited

U.S. PATENT DOCUMENTS

| | | | | | |
|---|---|---|---|---|---|
| 2004/0109189 | A1* | 6/2004 | Ikeda | H04N 1/1215 | 358/1.14 |
| 2005/0013620 | A1* | 1/2005 | Sugita | H04N 1/04 | 399/13 |
| 2010/0053706 | A1* | 3/2010 | Jasinski | H04N 1/00087 | 358/498 |

(Continued)

FOREIGN PATENT DOCUMENTS

| | | | |
|---|---|---|---|
| JP | 2013-145938 | A | 7/2013 |
| JP | 2014-011766 | A | 1/2014 |
| JP | 2018-182614 | A | 11/2018 |

*Primary Examiner* — Nicholas Pachol

(74) *Attorney, Agent, or Firm* — Harness, Dickey & Pierce, P.L.C.

(57) ABSTRACT

An image reading device includes a main body including a light transmissive plate on a top surface of the main body, a document placing plate on the top surface of the main body adjacent to the light transmissive plate in a first direction to place a document, and an image reader movable under the light transmissive plate and the document placing plate in the first direction to read image on the document, and a document conveyor including a document setting unit to set the document, a document conveyor movable between an open position and a closed position, and an image pattern portion at a bottom surface of the document conveyor, the image pattern portion having an image pattern to be read by the image reader at a position under the light transmissive plate.

16 Claims, 4 Drawing Sheets

(56) References Cited

U.S. PATENT DOCUMENTS

| | | | | |
|---|---|---|---|---|
| 2010/0073737 | A1* | 3/2010 | Honda | H04N 1/1017 358/474 |
| 2014/0168728 | A1* | 6/2014 | Fujiwara | H04N 1/00551 358/498 |
| 2016/0006893 | A1* | 1/2016 | Ooki | H04N 1/32667 358/498 |
| 2016/0212278 | A1* | 7/2016 | Yamazaki | H04N 1/32657 |
| 2017/0366698 | A1* | 12/2017 | Asai | H04N 1/00018 |
| 2018/0183968 | A1* | 6/2018 | Furukawa | H04N 1/00013 |
| 2018/0302530 | A1 | 10/2018 | Inui et al. | |
| 2022/0086296 | A1* | 3/2022 | Hiro | H04N 1/00771 |

* cited by examiner

IMAGE READING DEVICE INCLUDING AN IMAGE PATTERN PORTION AND IMAGE FORMING APPARATUS

CROSS-REFERENCE TO RELATED APPLICATIONS

This patent application is based on and claims priority pursuant to 35 U.S.C. § 119(a) to Japanese Patent Application No. 2023-032505, filed on Mar. 3, 2023, in the Japan Patent Office, the entire disclosure of which is incorporated by reference herein.

BACKGROUND

Technical Field

Embodiments of the present disclosure relate to an image reading device that reads image information of a document and an image forming apparatus such as a copying machine including the image reading device, a printer including the image reading device, a facsimile including the image reading device, a multifunctional peripheral including the copying machine, the printer, and the facsimile, or a printing machine including the image reading device.

Related Art

In the related art, image forming apparatuses such as copying machines, printers, and printing machines that automatically convey (feed) a document set in a document conveying unit (automatic document feeder (ADF)) and reads image information of the document are widely used. Most of such image reading devices are configured so that a document conveying unit can be opened and closed with respect to a reading apparatus main body (image forming apparatus main body).

On the other hand, a technology is known that uses a pattern portion that can be read by an optical unit (reading unit) to detect a paper jam in the document conveying unit. The pattern portion is stuck to the bottom surface of the document conveying unit so as to be displaced from the image reading position in the width direction.

SUMMARY

According to an embodiment of the present disclosure, an image reading device includes circuitry, a reading device main body including a document placing plate made of a light transmissive material and disposed on a top surface of the reading device main body to place a document, and a light transmissive plate made of a light transmissive material and disposed on the top surface of the reading device main body and near the document placing plate, a document conveying unit to open and close the top surface of the reading device main body and to convey the document set in a document setting unit to pass a position of the light transmissive plate while closing the top surface, and an image reading unit to move in a moving direction in which the light transmissive plate and the document placing plate are side by side by a moving driver under the light transmissive plate and the document placing plate in the reading device main body, and read image information of the document conveyed by the document conveying unit while the image reading unit is stopping under the light transmissive plate. The image reading unit includes an image pattern portion at a bottom of the image reading unit to be read by the image reading unit while the image reading unit is stopping under the light transmissive plate. The circuitry stops conveying the document from the document setting unit of the image conveying unit when the image reading unit fails to read the image pattern portion. According to an embodiment of the present disclosure, an image forming apparatus includes the image reading device.

According to an embodiment of the present disclosure, an image forming apparatus includes the image reading device.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
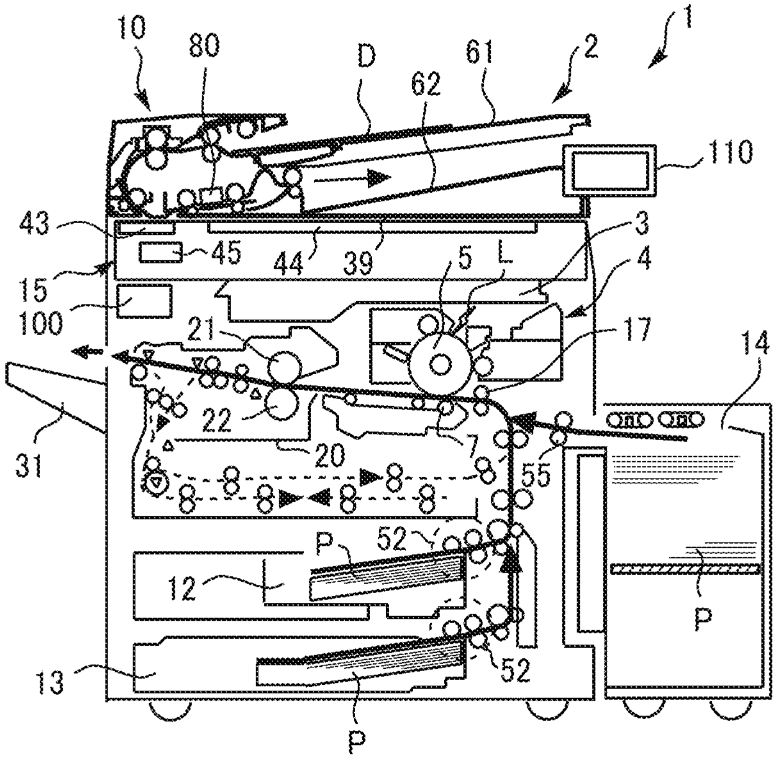
FIG. 1 is a diagram illustrating an overall configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Referring now to the drawings, embodiments of the present disclosure are described below. As used herein, the singular forms "a," "an," and "the" are intended to include the plural forms as well, unless the context clearly indicates otherwise.

According to one aspect of the present disclosure, an image reading device and an image forming apparatus in which the document is less likely to be automatically conveyed by mistake while the document conveying unit is opened can be provided.

Embodiments of the present disclosure are described in detail with reference to the drawings. In the drawings, the same or like reference signs denote like elements having substantially the same or corresponding configurations, and descriptions thereof may be omitted.

The overall configuration and operation of an image forming apparatus 1 will be described with reference to FIG. 1. In FIG. 1, the image forming apparatus 1 serving as a copying machine includes an image reading device 2 that optically reads image information of a document D, an exposure unit 3 that exposes a photoconductive drum 5 to an exposing light beam L based on the image information read by the image reading device 2 or a second image reading unit 80, an image forming unit 4 that forms a toner image (image) on the photoconductive drum 5, and a transfer unit 7 (image forming section) that transfers the toner image formed on the photoconductive drum 5 to a sheet P such as a sheet of paper. The image forming apparatus 1 also includes a document conveying unit 10 (automatic document feeder (ADF)) that conveys the document D set on a document setting unit 61 to a first exposure glass 43 of a reading device main body 15 or the second image reading unit 80 and ejects the document D to the document ejection unit 62, sheet feeding units 12, 13, and 14 that store sheets P, and a registration roller 17 (timing roller) that conveys the sheet P to the transfer unit 7. Further, the image forming apparatus 1 includes the reading device main body 15 (image reading device main body) of the image reading device 2, a fixing device 20 that fixes the toner image (unfixed image) borne on the paper 20, a fixing roller 21 disposed in the fixing device 20, a pressure roller 22 disposed in the fixing device 20, a sheet ejection tray 31 on which the sheet P ejected from the main body of the image forming apparatus 1 is stacked, and the second image reading unit 80 that optically reads image information on the back surface of the document D conveyed by the document conveying unit 10. An operation display panel 110 (operation display unit) for displaying various information of the image forming apparatus 1 and inputting various commands is disposed in the exterior of the image forming apparatus 1.

In an embodiment of the present disclosures, an image forming apparatus includes the image reading device.

The document conveying unit 10 is disposed so as to cover the upper surface of the reading device main body 15 that is a part of the main body of the image forming apparatus 1. The document conveying unit 10 is configured to rotate around the hinge 88 (see FIG. 6) to expose or cover the upper surface (on which the second exposure glass 44 and the first exposure glass 43 are disposed) of the reading device main body 15. In other words, the document conveying unit 10 is configured to open and close. A platen plate 39 (see FIGS. 6 and 7) for pressing the document D on the second exposure glass 44 is disposed on the bottom surface of the document conveying unit 10. The bottom surface faces the second exposure glass 44.

Referring to FIG. 1, the operation of the main body of the image forming apparatus 1 during typical image formation will be described. The document D is placed on the document setting unit 61 of the document conveying unit 10 or placed on the second exposure glass 44 through an opening and closing operation (rotation) of the document conveying unit 10, depending on a user's selection. When the document D is placed on the document setting unit 61 of the document conveying unit 10, the document D is conveyed (fed) from the document setting unit 61 in the document conveying unit 10 and passes through the position of the first exposure glass 43 of the image reading device 2. In the image reading device 2, the image information of the front surface of the document D passing over the first exposure glass 43 is optically read by an image reading unit 45 (as a first image reading unit) stopped under the first exposure glass 43. The optical image information read by the image reading unit 45 at the position of the first exposure glass 43 is converted into an electrical signal and then transmitted to the exposure unit 3 (writing unit). The exposure unit 3 emits an exposing light beam L such as a laser light beam based on the image information of the electrical signal toward the photoconductive drum 5 of the image forming unit 4.

When the opening and closing operation (rotation) of the document conveying unit 10 is performed and the document D is placed on the second exposure glass 44 (between the second exposure glass 44 and the platen plate 39), the image information of the document D placed on the second exposure glass 44 is optically read while the image reading unit 45 (see FIGS. 4 to 6) in the reading device main body 15 is moving (running) in a predetermined direction (the left and right direction in FIG. 1). The optical image information read by the image reading unit 45 at the position of the second exposure glass 44 is converted into an electrical signal and then transmitted to the exposure unit 3 (writing unit). The exposure unit 3 emits an exposing light beam L such as a laser light beam based on the image information of the electrical signal toward the photoconductive drum 5 of the image forming unit 4.

In the image forming unit 4, the photoconductive drum 5 is rotated in the clockwise direction in FIG. 1, and an image (toner image) corresponding to the image information is formed on the photoconductive drum 5 via predetermined image forming processes (charging process, exposure process, and developing process). Then, the image formed on the photoconductive drum 5 is transferred onto the sheet P conveyed by the registration roller 17 at the position of the transfer unit 7.

On the other hand, the sheet P to be conveyed to the transfer unit 7 (image forming section) moves as follows. One of the multiple sheet feeding units 12 to 14 of the image forming apparatus 1 is automatically or manually selected. For example, the uppermost sheet feeding unit 12 in the main body of the image forming apparatus 1 is selected. The top sheet of the sheets P stored in the sheet feeding unit 12 is conveyed (fed) by the sheet feeding unit 52 including a feed roller, a pickup roller, and a backup roller and is conveyed toward the conveying path. Then, the sheet P passes through the conveying path on which multiple conveying rollers are disposed and reaches the position of the registration roller 17.

The sheet P that has reached the position of the registration roller 17 is conveyed to the transfer unit 7 (image forming section) at a proper timing such that the image formed on the photoconductive drum 5 is positioned on the sheet P. The sheet P after the transfer process passes through the position of the transfer unit 7 and reaches the fixing device 20 via the conveying path. The sheet P that has reached the fixing device 20 is fed between the fixing roller 21 and the pressure roller 22, and the toner image is fixed by the heat received from the fixing roller 21 and the pressure received from both the fixing roller 21 and the pressure roller 22 (i.e., fixing process). The sheet P on which the toner image has been fixed by the fixing process is sent out from a space (fixing nip) between the fixing roller 21 and the pressure roller 22 is ejected from the main body of the image forming apparatus 1, and is stacked on the ejection tray 31 as an output image. As described above, a series of image forming processes is completed.

When the document D is placed on the document setting unit 61 of the document conveying unit 10 and image formation is performed based on an image of the back surface of the document D in addition to the front surface of the document D, the image information of the back surface of the document D passing below the second image reading unit 80 (CIS) via the first exposure glass 43 is optically read by the second image reading unit 80 in the document conveying unit 10. Then, as in the image forming processes based on the image of the front surface, the optical image information read by the second image reading unit 80 is transmitted to the exposure unit 3, and the image forming processes based on the optical image information is performed.

Figure 2:
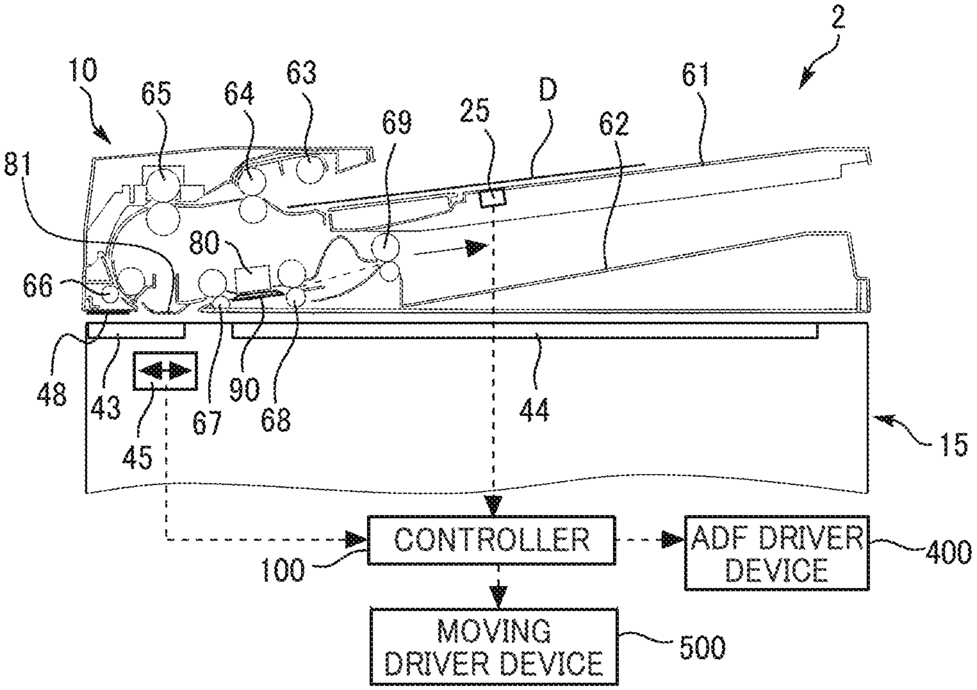
FIG. 2 is a is a diagram illustrating an image reading device of the image forming apparatus in FIG. 1.

The document conveying unit 10 will be briefly described below with reference to FIG. 2. As illustrated in FIG. 2, the document conveying unit 10 includes a document setting unit 61 (document table), a document-setting detecting sensor 25, an opposing part 81, the second image reading unit 80, an abutting part 90, the document ejection unit 62 (sheet ejection tray), a pickup roller 63, a separating-and-conveying roller pair 64 (sheet feed roller and separation roller), multiple conveying roller pairs (the first conveying roller pair 65 to the fourth conveying roller pair 68), and an ejection roller pair 69 (sheet ejection roller pair).

The document setting unit 61 has an open space at the top thereof, and is configured so that the document D with the front surface thereof facing upward is placed by the user (a bundle of multiple documents D can be stacked). The document-setting detecting sensor 25 is disposed in the document setting unit 61. The document-setting detecting sensor 25 optically detects whether the document D is set. The document ejection unit 62 is disposed under the document setting unit 61, and is configured so that the document D after the image is read by the image reading device 2 or the second image reading unit 80 is ejected and placed. In other words, the document ejection unit 62 is configured so that multiple documents D are stacked.

In the conveying path from the document setting unit 61 to the document ejection unit 62, the pickup roller 63, the separating-and-conveying roller pair 64, the first conveying roller pair 65, the second conveying roller pair 66, the third conveying roller pair 67, the fourth conveying roller pair 68, and the ejection roller pair 69 are disposed in this order from the upstream in the conveying direction. These rollers (the pickup roller 63 to the ejection roller pair 69) function as a conveying unit that conveys the document D placed on the document setting unit 61 toward the first image reading unit (between the first exposure glass 43 and the opposing part 81) or the second image reading unit 80, and conveys the document D after image reading toward the document ejection unit 62. An ADF driver 400 (see FIG. 2) that drives such a conveying unit is driven and stopped by the control of a controller 100.

Figure 3:
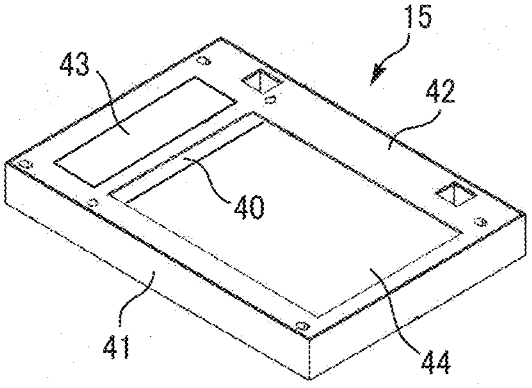
FIG. 3 is a perspective view of a reading device main body of the image reading device illustrated in FIG. 2.
Figure 4:
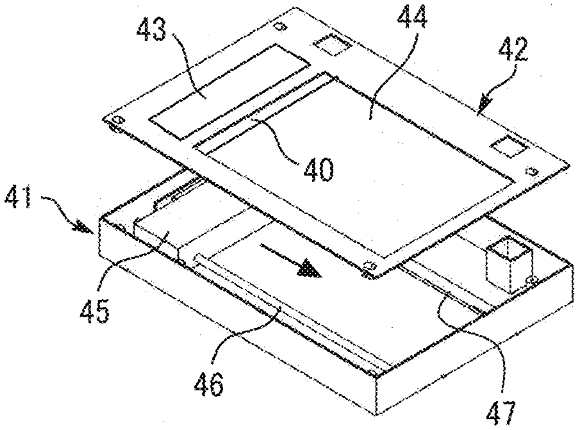
FIG. 4 is a perspective view of the reading device main body of FIG. 3 with a cover removed.

The configuration and operation of the reading device main body 15 in the image reading device 2 will be described below with reference to FIGS. 3 to 5. As described above with reference to FIG. 1, the reading device main body 15 is disposed under the document conveying unit 10. The reading device main body 15 may be a part of the main body of the image forming apparatus 1 or may be detachably attached to the main body of the image forming apparatus 1. As illustrated in FIGS. 3 and 4, the reading device main body 15 includes a cover 42 fixedly disposed on a housing 41 (frame) by fastening with screws, and components such as the image reading unit 45, a guide rod 46 (guide), a rail 47, and a moving driver 500, which are disposed in a substantially closed space inside the reading device main body 15. The cover 42 has two substantially rectangular openings, and the first exposure glass 43 (light transmissive plate) and the second exposure glass 44 (document placing plate) are disposed to cover the two openings, respectively, so as to be fitted to the openings. A white reference plate 40 having a white reading surface is disposed near or on the second exposure glass 44. The housing 41 and the cover 42 are both made of, for example, a resin material having a high mechanical strength. The first exposure glass 43 as a light transmissive plate is a component made of a light transmissive material such as a transparent glass, and the surface thereof functions as an image reading surface (document conveying surface). As described above with reference to FIGS. 1 and 2, the document D is conveyed by the document conveying unit 10 along the image reading surface (document conveying surface). The image reading unit 45 is moved and stopped at the position of the first exposure glass. A light source 401 of the image reading unit 45 irradiates the document D with the light beam via the first exposure glass, and the document reflects the light beam as a reflected light beam. The image information of the document D is read by the reading sensor 410 of the image reading unit 45 receiving the reflected light beam via the first contact glass.

The second exposure glass 44 functions as the document placing plate and is made of a light transmissive material such as transparent glass. The second exposure glass is also a component on which the document D can be placed, and the surface of the second exposure glass 44 functions as a document placing part (document placing surface) for the document D. Then, the image information of the document D placed on the second exposure glass 44 by the user is optically read by the image reading unit 45 that movies in a predetermined direction (the arrow direction in FIG. 4, which is the sub-scanning direction).

Figure 5:
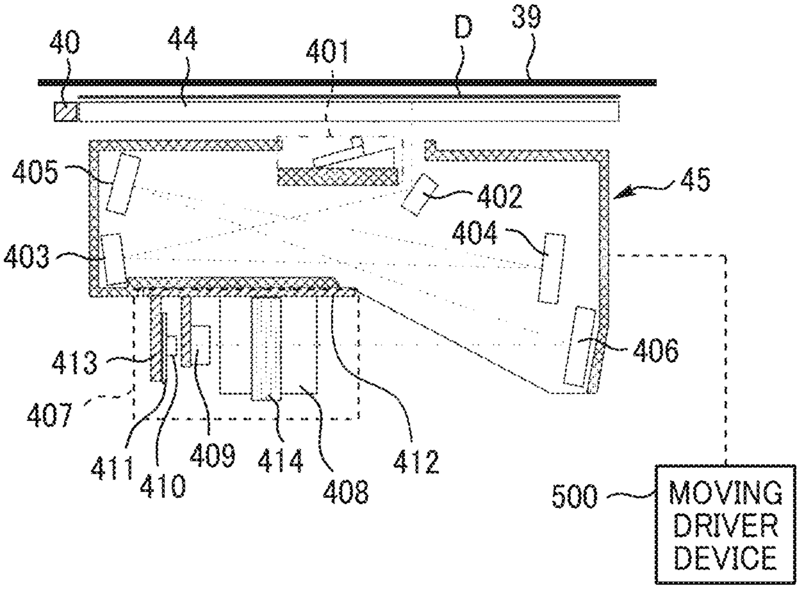
FIG. 5 is a diagram illustrating a configuration of an image reading unit.

As illustrated in FIG. 5, the image reading unit 45 includes the light source 401, multiple mirrors 402 to 406 (multiple optical elements), and an imaging unit 407. Further, the imaging unit 407 includes multiple imaging lenses 408 and 409, the reading sensor 410, a receiving table 412, an adjustment bracket 413, and a lens band 414. Specifically, with referring to FIG. 5, the image reading unit 45 moves (runs) in the predetermined direction (sub-scanning direction) with respect to the document D placed on the second exposure glass 44 by the operation of the moving driver 500. The light source 401 irradiates the document D with a light beam via the second exposure glass 44 over the main scanning direction (perpendicular to the sub-scanning direction, and a perpendicular direction to the drawing in FIG. 5) while the image reading unit 45 is moving. The document D reflects the light beam from the light source 401 as a reflected light beam. The image information of the document D is red by the reading sensor 410 receiving the reflected light beam via the second exposure glass 44, the multiple mirrors 402 to 406 (multiple optical elements), and the imaging lenses 408 and 409. The image sensor 410 is, for example, a charge coupled device (CCD) or a complementary metal oxide semiconductor (CMOS) mounted on a board 411. In an embodiment of the present disclosure, the board 411 mounted with the reading sensor 410 is fixedly disposed on the adjustment bracket 413 disposed on the receiving table 412, and the position of the board 411 can be adjusted by the adjustment bracket 413. The first imaging lens 408 is fixed to the receiving table 412 via the lens band 414, and the second imaging lens 409 is fixed to the receiving table 412 via a bracket.

Referring to FIG. 4, a guide rod 46 (shaft-shaped member) serving as a guide is made of a metal material, and is fitted to the image reading unit 45 so as to extend in the predetermined direction (sub-scanning direction). The guide rod 46 guides the image reading unit 45 in the predetermined direction (the arrow direction in FIG. 4, the left and right directions in FIG. 5, which is the sub-scanning direction). In an embodiment of the present disclosure, both ends of the guide rod 46 in the sub-scanning direction (predetermined direction) are supported at the housing 41 at one end of the main scanning direction. Referring to FIG. 4, the rail 47 is made of a thick sheet metal having a relatively high mechanical strength, and extends in the sub-scanning direction so as to slidably hold the image reading unit 45 with another end of the image reading unit 45 in the main scanning direction placed on the rail 47. Further, the image reading unit 45 is connected to the moving driver 500 using a wire, a feed screw, or a motor drive. The image reading unit 45 can reciprocally move in the sub-scanning direction by the moving driver 500 controlled by the controller 100 (see FIGS. 1 and 2).

With reference to FIGS. 6 to 9, the characteristic configuration and operation of the image reading device 2 according to an embodiment of the present disclosure will be described in detail. As described above, the image reading device 2 in the present embodiment reads image information of the document D and includes the reading device main body 15 and the document conveying unit 10.

The second exposure glass 44 serving as a document placing plate and the first exposure glass 43 serving as a light transmissive plate are disposed on the upper surface (the surface facing the document conveying unit 10) of the reading device main body 15. The second exposure glass 44 is a document placing plate that is made of a light transmissive material and can place the document D thereon. The first exposure glass 43 is a light transmissive plate that is made of a light transmissive material and disposed at a position (on the left side in FIG. 2) adjacent to the second exposure glass 44 (document placing plate). The first exposure glass 43 is disposed so as to face the opposing part 81 and the image pattern portion 48 described later.

The image reading unit 45 is disposed in the reading device main body 15. The image reading unit 45 can be moved by the moving driver 500 under the first exposure glass 43 and the second exposure glass 44 in the left and right direction in FIG. 2 (the direction in which the first exposure glass 43 and the second exposure glass 44 are adjacent to each other). In the automatic document conveyance, the image reading unit 45 reads the image information of the document D conveyed by the document conveying unit 10 after the image reading unit 45 has moved and stopped under the opposing part 81 via the first exposure glass 43 (light transmissive plate). On the other hand, when the document is not being conveyed, the image reading unit 45 reads the image information of the document D placed on the second exposure glass 44 (document placing plate) while being moved in the left and right direction (moving direction) in FIG. 2 by the moving driver 500.

In an embodiment of the present disclosure, in the image reading apparatus further includes a mover to move the image reader the under the light transmissive plate and the document placing plate in the first direction. The circuitry causes the image reader to read the image on the document placed on the document placing plate while causing the mover to move the image reader in the first direction.

The document conveying unit 10 is configured so that the document conveying unit 10 can open and close the upper surface of the image reading device 15. Specifically, the document conveying unit 10 is configured so that the document conveying unit 10 rotates around the hinge 88 to switch a state in which the upper surface of the reading device main body 15 is closed (a closed state) illustrated in FIG. 2 and a state in which the upper surface of the reading device main body 15 is open (an open state) illustrated in FIG. 6. As described above with reference to FIG. 2, the document conveying unit 10 conveys the document D set on the document setting unit 61 and passes the document D through the position of the first exposure glass 43 (between the opposing part 81 and the first exposure glass 43) when the upper surface of the reading device main body 15 is closed (closed state).

Figure 6:
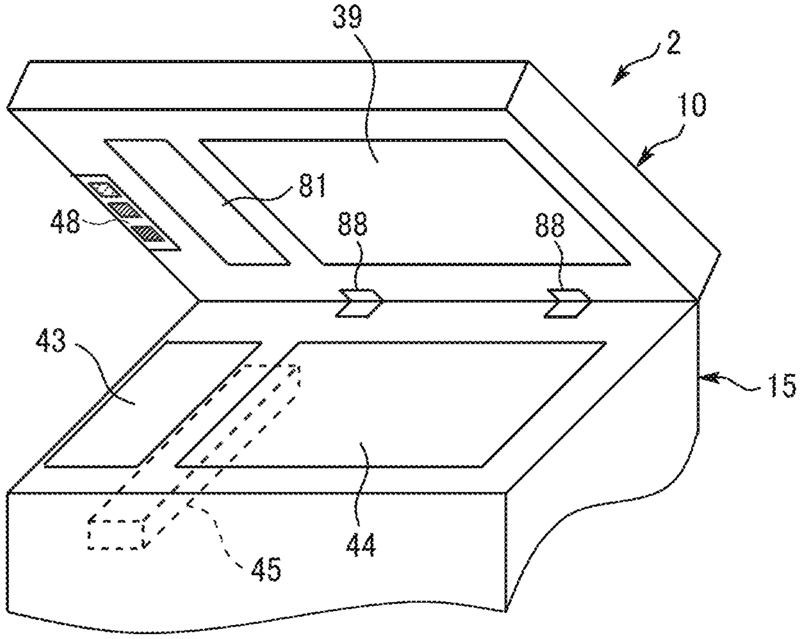
FIG. 6 is a schematic perspective view of a document conveying unit opened with respect to the reading device main body of FIG. 3.
Figure 7:
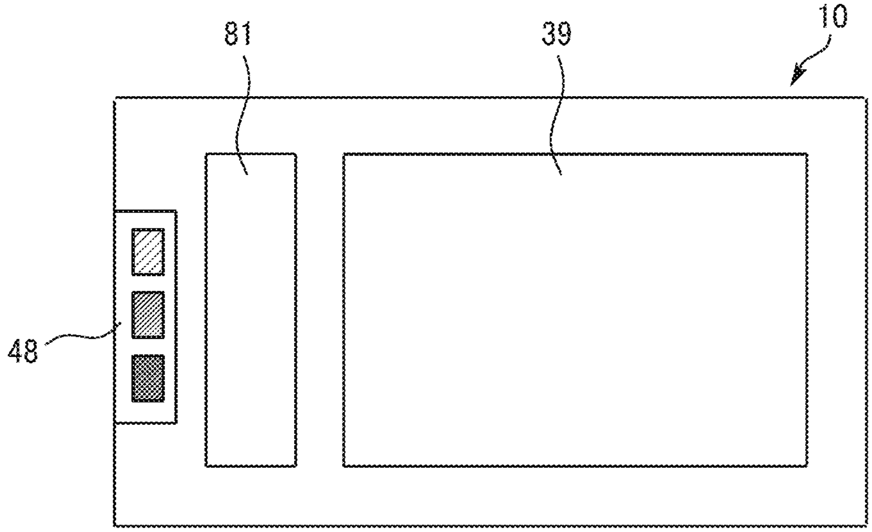
FIG. 7 is a bottom view of the document conveying unit of FIG. 6.

Referring to FIGS. 6 and 7 (and FIG. 2), in an embodiment of the present disclosure, the image pattern portion 48 is disposed on the document conveying unit 10. Specifically, the image pattern portion 48 is disposed on the bottom surface of the document conveying unit 10 and a position that does not prevent the conveyance of the document D by the document conveying unit 10. The image reading unit 45 that is stopping under the first exposure glass 43 (light transmissive plate) can read the image pattern portion 48. The bottom surface is a surface on which the platen plate 39 is disposed and opposed to the first exposure glass 43 and the second exposure glass 44 in the closed state. When the image reading unit 45 cannot read the image pattern portion 48, the controller 100 determines that the document conveying unit 10 is in the open state, and controls the document conveying unit 10 not to convey the document D from the document setting unit 61 of the document conveying unit 10. By contrast, when the image reading unit 45 can read the image pattern portion 48, the controller 100 determines that the document conveying unit 10 is the close state, and controls the document conveying unit 10 to convey the document D from the document setting unit 61 of the document conveying unit 10. In other words, in the closed state, the image pattern portion 48 is read by the image reading unit 45 that is stopping at the position under the first exposure glass 43.

In the present specification, the case where the image reading unit 45 (reading sensor 410) cannot read the image pattern portion includes the case where the image pattern portion cannot be completely read and the case where the image pattern cannot be read within a predetermined reference detection range. In other words, as described below with reference to FIG. 8, the case where the range of change of the light quantity data detected by the image reading unit 45 (reading sensor 410) is out of the predetermined range with respect to the predetermined reference light quantity data is also the case where the image pattern portion cannot be read. Thus, in the present specification, the case where the image reading unit 45 (reading sensor 410) can read the image pattern portion is the case other than the above-mentioned case where the image pattern portion cannot be read.

In an embodiment of the present disclosure, when the document D is detected by the document-setting detecting sensor 25 (see FIG. 1) serving as a document-setting detecting unit, and the image reading unit 45 cannot read the image pattern portion 48, the controller 100 controls the document conveying unit 10 not to convey the document D from the document setting unit 61 of the document conveying unit 10. Specifically, in such a case, the controller 100 controls the ADF driver 400 to stop (prevent) the document conveying unit 10 from driving. When the document D is set on the document setting unit 61, and the image reading unit 45 cannot read the image pattern portion 48, the controller 100 controls the document conveying unit 10 in the open state not to be driven even if the print key of the operation display panel 110 is pressed by the user. In such a case, the controller 100 notifies the user that the document conveying unit 10 is in the open state. If the document D is set on the document setting unit 61 and the image reading unit 45 cannot read the image pattern portion 48, the operation display panel 110 displays a message indicating that the document conveying unit 10 is in the open state, the document D set on the document conveying unit 10 cannot be automatically conveyed, and the image cannot be read.

In an embodiment of the present disclosure, the image reading device further includes a detector to detect whether the document is set in the document setting unit. The circuitry stops conveying the document from the document setting unit toward the light transmissive plate when the detector detects the document and the image reader fails to read the image pattern on the image pattern portion.

In an embodiment of the present disclosure, in the image reading device, the circuitry cause a display to display that the document conveyor is at the open position when the image reader fails to read the image pattern on the image pattern portion.

In an embodiment of the present disclosure, in the image reading device, the circuitry stops driving the document conveyor when the image reader fails to read the image pattern on the image pattern portion.

Accordingly, the inconvenience that the document D is automatically conveyed by mistake while the document conveying unit 10 is in the open state as illustrated in FIG. 6 is reduced. As a result, it is less likely to occur that the document D is jammed in the document conveying unit 10 in the open state.

In an embodiment of the present disclosure, even if the image reading unit 45 cannot read the image pattern portion 48, the image reading unit 45 can also read the image information of the document D placed on the second exposure glass 44 (document placing plate). Specifically, even when the image reading unit 45 cannot read the image pattern portion 48 and the document conveying unit 10 is in the open state, a second document setting sensor detects the document D placed on the second exposure glass 44. Then, when a print key for specifying the non-document conveying time is pressed, the image reading unit 45 reads the image information of the document D on the second exposure glass 44 while moving under the second exposure glass 44. With this configuration, even when the document D (e.g., a page of a thick book) is not fit between the second exposure glass 44 and the platen plate 39, or when the document D (e.g., a newspaper) extends over the second exposure glass 44, the document D can be printed without conveyance.

In an embodiment of the present disclosure, in the image reading device, the circuitry causes the image reader to read the image on the document placed on the document placing plate while causing the mover to move the image reader in the first direction when the image reader fails to read the image pattern on the image pattern portion.

Referring to FIGS. 6 and 7 (and FIG. 2), in an embodiment of the present disclosure, the image pattern portion 48 is disposed at a position corresponding to the upstream side of the first exposure glass 43 (light transmissive plate) in the conveying direction of the document D on the bottom surface (the surface on which the platen plate 39 is disposed) of the document conveying unit 10 in the closed state. In other words, as illustrated in FIG. 7, the image pattern portion 48 is disposed on the bottom surface of the document conveying unit 10 at a position on the left side in FIG. 7 (a position displaced upstream from the reading position) with respect to the opposing part 81 (a part opposing the first exposure glass 43 in the closed state). With this configuration, as in the case where the image pattern portion 48 is disposed at the right side of the opposing part 81 in FIG. 7 (between the opposing part 81 and the second exposure glass 44), it is less likely to occur that the image pattern portion 48 is also read by the image reading unit 45 that moves in the left and right direction of FIGS. 2 and 7 when reading the document D on the second exposure glass 44 during non-conveyance of the document.

In an embodiment of the present disclosure, in the image reading device, the image pattern portion at the closed position of the document conveyor is upstream of the light transmissive plate in the first direction.

As illustrated in FIGS. 7 and 6, in an embodiment of the present disclosure, the image pattern portion 48 includes a blue patch pattern, a green patch pattern, and a red patch pattern that are disposed on the surface of a rectangular white base portion extending in the main scanning direction (the vertical direction in FIG. 7) at intervals of about 1 cm in order from the bottom to the top of FIG. 7. These patch patterns are each about 1 cm square, have different reflectivities in the main scanning direction, and have shapes that allow the peak values of the light quantities to be obtained.

The image reading unit 45 that is stopped at the reading position below the first exposure glass 43 (the reading position may be shifted slightly upstream from the reading position at the time of automatic document conveying) determines whether the document conveying unit 10 is in the open state or the closed state based on the reading result of the image pattern portion 48. According to an embodiment of the present disclosure, the three primary colors of light, i.e., red, green, and blue, are used for the image pattern portion 48. However, any colors other than red, green, and blue may be used for the image pattern portion 48 as long as the image reading unit 45 can detect the open or close state of the document conveying unit 10. However, if a black pattern is used for the image pattern portion 48, the image pattern portion 48 may be mistakenly detected in a dark room or by ambient light. Further, if the image pattern portion 48 is a complex pattern, the cost is higher.

Figure 8:
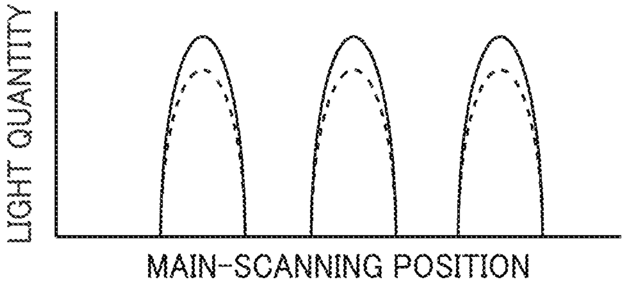
FIG. 8 is a graph of an output of a light quantity at a time of reading an image pattern by an image reading unit.

FIG. 8 is a graph of the output (light quantity data of three patch patterns) when the image reading unit 45 reads the image pattern portion 48 in an embodiment of the present disclosure. In FIG. 8, the reference light quantity data is indicated by the solid line, and the actual reading light quantity data is indicated by the broken line. When the reference light quantity data and the actual reading light quantity data are compared and the change width (difference between two data) is within a predetermined range, it is recognized that the document conveying unit 10 is in the closed state.

By contrast, if the change width is out of the predetermined range, it is recognized that the document conveying unit 10 is in the open state. In the present embodiment, the image pattern portion 48 is not formed over the overall reading range in the main scanning direction, but is formed within a width of about 5 cm at the center of the overall reading range. Accordingly, the cost of the image pattern portion 48 can be reduced, and the light quantity reduction at the peripheral of the image pattern portion 48 that is a reading property of the image reading unit 45 can be prevented.

Figure 9:
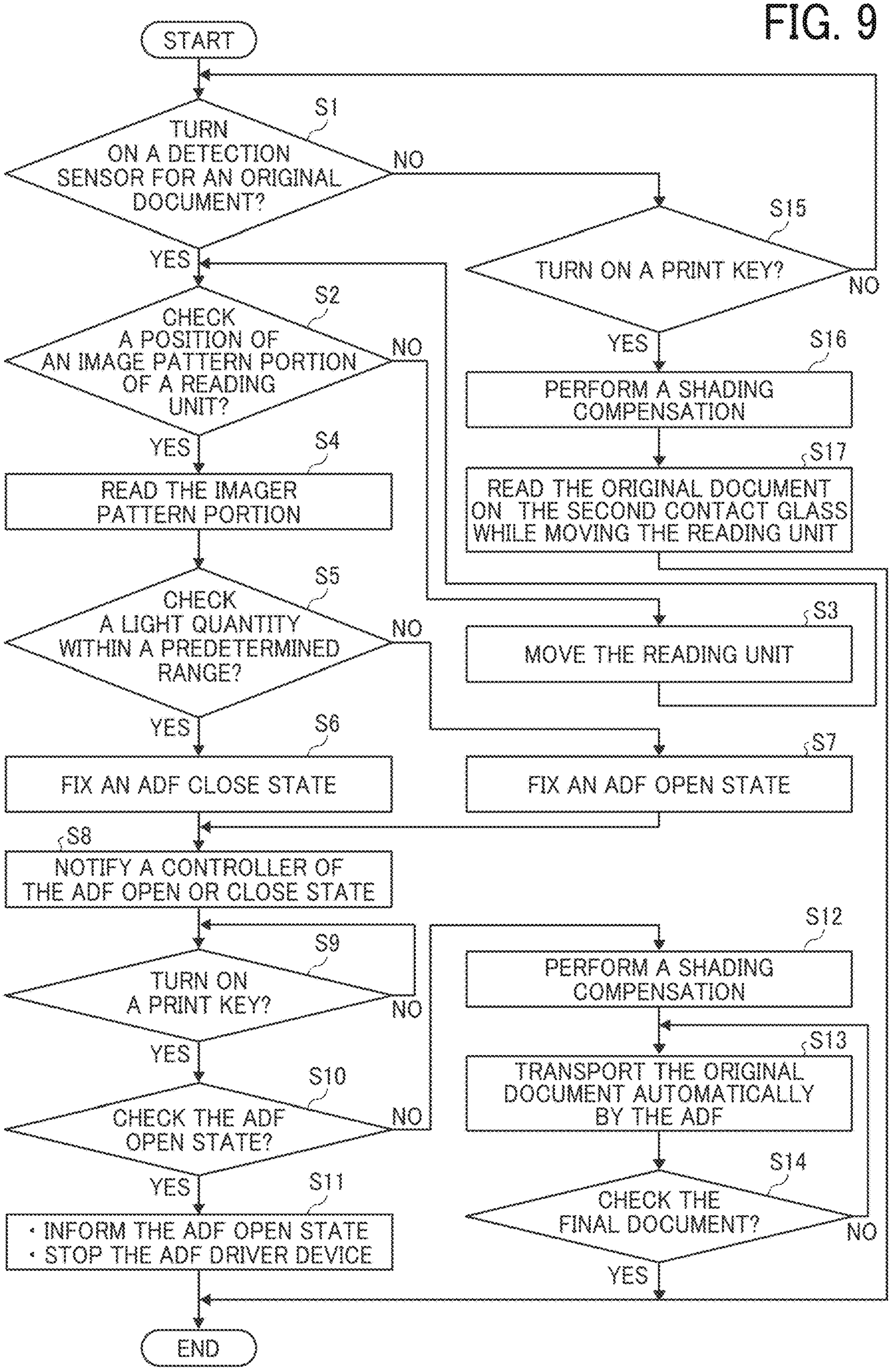
FIG. 9 is a flowchart of control performed in the image reading device of FIG. 2, according to an embodiment of the present disclosure.

Control performed by the image reading device 2 according to an embodiment of the present disclosure will be described below with reference to FIG. 9. It is determined whether the document D set on the document setting unit 61 is detected by the document-setting detecting sensor 25 (step S1). As a result, when the document D is set on the document setting unit 61 and the image reading unit 45 is located at a position (reading position) under the image pattern portion 48, the image reading unit 45 reads the image pattern portion 48 (steps S2 to S4). Then, when the reading result of the image pattern portion 48 read by the image reading unit 45 (reading light quantity) is within the predetermined range, the state of the document conveying unit 10 is fixed as the closed state (step S6).

When the result is out of the predetermined range, the state of the document conveying unit 10 is determined as the open state (step S7). Then, the controller 100 is notified of the result of the determination in step S6 or step S7 (whether the state is the open state or the closed state) (step S8). When the print key of the operation display panel 110 has been pressed (step S9), then it is determined whether the document conveying unit 10 is in the open state (whether the determination of the open state in step S7 has been performed) (step S10). As a result, when the document conveying unit 10 is in the open state, the operation display panel 110 notifies (displays) the fact that the document conveying unit 10 is in the open state and the controller 100 stops driving the ADF driver 400 (step S11). On the other hand, if the document conveying unit 10 is in the closed state in step S10 instead of the open state, shading compensation is performed (step S12). The shading compensation adjusts the light quantity of the image reading unit 45 using the white reference plate 40 illustrated in FIG. 4.

Then, the document conveying unit 10 repeatedly performs the document conveyance of the predetermined number of sheets and the image reading until the final of the document D (steps S13 and S14). On the other hand, when it is determined in step S1 that the document D is not set on the document setting unit 61 and it is detected that the document D of non-conveyance is set on the second exposure glass 44, it is determined whether the print key of the operation display panel 110 is pressed (step S15). When the print key is pressed, the shading compensation is performed (step S16), and then the image information of the document D on the second exposure glass 44 is read by the image reading unit 45 (step S17).

As described above, the image reading device 2 according to an embodiment of the present disclosure includes the reading device main body 15 including the second exposure glass 44 (document placing plate) that is made of a light transmissive material and can place the document D thereon, and the first exposure glass 43 (light transmissive plate) that is made of a light transmissive material and disposed at a position near the second exposure glass 44, on the upper surface thereof. The image reading device 2 is also an image reading device that reads image information of the document D. The document conveying unit 10 is configured to open and close the upper surface of the reading device main body 15, and conveys the document D set on the document setting unit 61 to pass through the first exposure glass 43 when the upper surface is closed.

Further, the image reading unit 45 is disposed in the reading device main body 15 so that the image reading unit 45 can moves in a direction in which the first exposure glass 43 and the second exposure glass are side by side under the first exposure glass 43 and the second exposure glass 44 by the moving driver 500. The image reading unit stops under the first exposure glass 43 and read the image information of the document D conveyed by the document conveying unit 10. The document conveying unit 10 includes an image pattern portion 48 on the bottom surface thereof and at a position where the image pattern portion 48 does not interfere with the conveyance of the document D. The image pattern portion 48 can be read by the image reading unit 45 that moves and stops under the first exposure glass 43. In addition, the controller 100 controls the image reading unit 45 not to convey the document D from the document setting unit 61 of the document conveying unit 10 when the image pattern portion 48 cannot be read by the image reading unit 45. Accordingly, it is less likely to occur that the document D is automatically conveyed by mistake while the document conveying unit 10 is the open state.

In an embodiment of the present disclosure, an image reading device includes a main body including a light transmissive plate on a top surface of the main body, the light transmissive plate transmittable a light, a document placing plate on the top surface of the main body adjacent to the light transmissive plate in a first direction to place a document, the document placing plate transmittable a light, and an image reader movable under the light transmissive plate and the document placing plate in the first direction to read image on the document, and a document conveyor including a document setting unit to set the document, a document conveyor movable between an open position to open the top surface of the main body and a closed position to close the top surface of the main body to convey the document set in the document setting unit to pass over the light transmissive plate at the closed position of the document conveyor, and an image pattern portion at a bottom surface of the document conveyor, the image pattern portion having an image pattern to be read by the image reader at a position under the light transmissive plate.

In an embodiment of the present disclosure, the image reading device further includes circuitry to cause the image reader stopped under the light transmissive plate to read the image pattern on the image pattern portion of the document conveyor and stop conveying the document from the document setting unit toward the light transmissive plate when the image reader fails to read the image pattern on the image pattern portion.

An embodiment of the present disclosure is applied to the image reading device 2 used in the image forming apparatus 1 serving as a monochromatic image forming apparatus, but an embodiment of the present disclosure can be also applied to an image reading device serving as a color image forming apparatus. Further, an embodiment of the present disclosure is applied to the image reading device 2 used in the image forming apparatus 1 serving as the electrophotographic image forming apparatus. However, the application of the present disclosure is not limited to this, and an embodiment of the present disclosure can be applied to an image reading device used in an image forming apparatus of other systems such as an inkjet image forming apparatus or a stencil printer. In these cases, the same effect as that of an embodiment of the present disclosure can be obtained.

It is obvious that the present disclosure is not limited to the present embodiment, and the present embodiment can be modified as appropriate in addition to the modifications suggested in the present embodiment within the scope of the technical idea of the present invention. In addition, the number, position, and shape of the constituent members described above are not limited to those in the present embodiment, and can be set to the number, position, or shape preferable for carrying out the present embodiment.

In the present application, the "document" is defined to include all documents made of sheet-like members such as OHPs in addition to original documents made of paper.

Aspects of the present invention are as follows.

First Aspect

An image reading device includes a main body including a light transmissive plate on a top surface of the main body, the light transmissive plate transmittable a light, a document placing plate on the top surface of the main body adjacent to the light transmissive plate in a first direction to place a document, the document placing plate transmittable a light, and an image reader movable under the light transmissive plate and the document placing plate in the first direction to read image on the document, and a document conveyor including a document setting unit to set the document, a document conveyor movable between an open position to open the top surface of the main body and a closed position to close the top surface of the main body to convey the document set in the document setting unit to pass over the light transmissive plate at the closed position of the document conveyor, and an image pattern portion at a bottom surface of the document conveyor, the image pattern portion having an image pattern to be read by the image reader at a position under the light transmissive plate.

Second Aspect

The image reading device according to the first aspect further includes circuitry to cause the image reader stopped under the light transmissive plate to read the image pattern on the image pattern portion of the document conveyor and stop conveying the document from the document setting unit toward the light transmissive plate when the image reader fails to read the image pattern on the image pattern portion.

Third Aspect

The image reading device according to any one of first or second aspect further includes a detector to detect whether the document is set in the document setting unit. The circuitry stops conveying the document from the document setting unit toward the light transmissive plate when the detector detects the document and the image reader fails to read the image pattern on the image pattern portion.

Fourth Aspect

In the image reading device according to the first or second aspect, the image pattern portion at the closed position of the document conveyor is upstream of the light transmissive plate in the first direction.

Fifth Aspect

In the image reading device according to the first or second aspect, the circuitry cause a display to display that the document conveyor is at the open position when the image reader fails to read the image pattern on the image pattern portion.

Sixth Aspect

In the image reading device according to the first or second aspect, the circuitry stops driving the document conveyor when the image reader fails to read the image pattern on the image pattern portion.

Seventh Aspect

The image reading apparatus according to the first or second aspect further includes a mover to move the image reader the under the light transmissive plate and the document placing plate in the first direction. The circuitry causes the image reader to read the image on the document placed on the document placing plate while causing the mover to move the image reader in the first direction.

Eighth Aspect

In the image reading device according to the first or second aspect, the circuitry causes the image reader to read the image on the document placed on the document placing plate while causing the mover to move the image reader in the first direction when the image reader fails to read the image pattern on the image pattern portion.

Ninth Aspect

An image forming apparatus includes the image reading device according to any one of the first to eighth aspects.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above. Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. An image reading device comprising:

a main body including:

a light transmissive plate on a top surface of the main body, the light transmissive plate being light transmissive;

a document placing plate on the top surface of the main body adjacent to the light transmissive plate in a first direction, the document placing plate configured to receive a document, the document placing plate being light transmissive; and an image reader configured to move under the light transmissive plate and the document placing plate in the first direction, and to read at least one image on the document; and a document conveyor including:

a document setting unit configured to receive the document;

the document conveyor configured to move between an open position with respect to the top surface of the main body and a closed position with respect to the top surface of the main body, the document conveyor configured to convey the document set in the document setting unit to pass over the light transmissive plate at the closed position of the document conveyor; and an image pattern portion on a bottom surface of the document conveyor, the image pattern portion having an image pattern to be read by the image reader at a position under the light transmissive plate, wherein the image pattern portion is provided on the bottom surface of the document conveyor and the image pattern portion is adjacent to an opposing part in the first direction, the opposing part being opposite from the light transmissive plate in response to the document conveyor being in the closed position.

2. The image reading device according to claim 1, further comprising:

circuitry configured to, stop the image reader under the light transmissive plate to read the image pattern on the image pattern portion of the document conveyor; and stop conveying the document from the document setting unit toward the light transmissive plate in response to the image reader failing to read the image pattern on the image pattern portion.

3. The image reading device according to claim 1, further comprising:

a detector configured to detect the document set in the document setting unit; and circuitry configured to cause the document conveyor to stop conveying the document from the document setting unit toward the light transmissive plate in response to the detector detecting the document and the image reader failing to read the image pattern on the image pattern portion.

4. The image reading device according to claim 1, wherein the image pattern portion at the closed position of the document conveyor is upstream of the light transmissive plate in the first direction.

5. The image reading device according to claim 1, further comprising:

circuitry configured to cause a display device to display that the document conveyor is at the open position in response to the image reader failing to read the image pattern on the image pattern portion.

6. The image reading device according to claim 1, further comprising:

circuitry configured to cause the document conveyor to stop in response to the image reader failing to read the image pattern on the image pattern portion.

7. The image reading device according to claim 1, further comprising:

a moving device configured to move the image reader in the first direction; and circuitry configured to cause the image reader to read the at least one image on the document placed on the document placing plate while causing the moving device to move the image reader in the first direction.

8. The image reading device according to claim 7, circuitry is further configured to cause the image reader to read the at least one image on the document placed on the document placing plate while causing the moving device to move the image reader in the first direction in response to the image reader failing to read the image pattern on the image pattern portion.

9. The image reading device according to claim 1, wherein the document placing plate is downstream from the light transmissive plate in the first direction.

10. The image reading device according to claim 1, further comprising:

circuitry configured to cause the image reader to read the at least one image on the document through the light transmissive plate in response to the document being placed on the document conveyor.

11. The image reading device according to claim 10, the circuitry is further configured to cause the image reader to read the at least one image on the document through the document placing plate in response to the document being placed on the document placing plate.

12. The image reading device according to claim 1, wherein the document conveyor is attached to the top surface of the main body via at least one hinge.

13. The image reading device according to claim 1, further comprising:

circuitry configured to determine whether the document conveyor is at the open position or the closed position based on results of the image reader reading the image pattern on the image pattern portion.

14. The image reading device according to claim 13, wherein the image pattern of the image pattern portion is formed using at least three colors.

15. The image reading device according to claim 14, the circuitry is further configured to determine whether the document conveyor is at the open position or the closed position by comparing light quantity data of the at least three colors of the image pattern of the image pattern portion read by the image reader and reference light quantity data corresponding to the at least three colors of the image pattern of the image pattern portion.

16. An image forming apparatus comprising:

a main body including:

an image forming device configured to form at least one image on a sheet, a light transmissive plate on a top surface of the main body, the light transmissive plate being light transmissive, a document placing plate on the top surface of the main body adjacent to the light transmissive plate in a first direction, the document placing plate configured to receive a document, the document placing plate being light transmissive, and an image reader configured to move under the light transmissive plate and the document placing plate in the first direction, and to read at least one image on the document, and a document conveyor including:

a document setting unit configured to set the document, the document conveyor configured to move between an open position with respect to the top surface of the main body and a closed position with respect to the top surface of the main body, the document conveyor configured to convey the document set in the document setting unit to pass over the light transmissive plate at the closed position of the document conveyor, and an image pattern portion on a bottom surface of the document conveyor, the image pattern portion having an image pattern to be read by the image reader at a position under the light transmissive plate, wherein the image pattern portion is provided on the bottom surface of the document conveyor and the image pattern portion is adjacent to an opposing part in the first direction, the opposing part being opposite from the light transmissive plate in response to the document conveyor being in the closed position.

* * * * *